Dec. 12, 1950 H. J. KRATZER Re. 23,307
VARIABLE COMPRESSION RATIO INTERNAL-COMBUSTION ENGINE
Original Filed Aug. 12, 1943
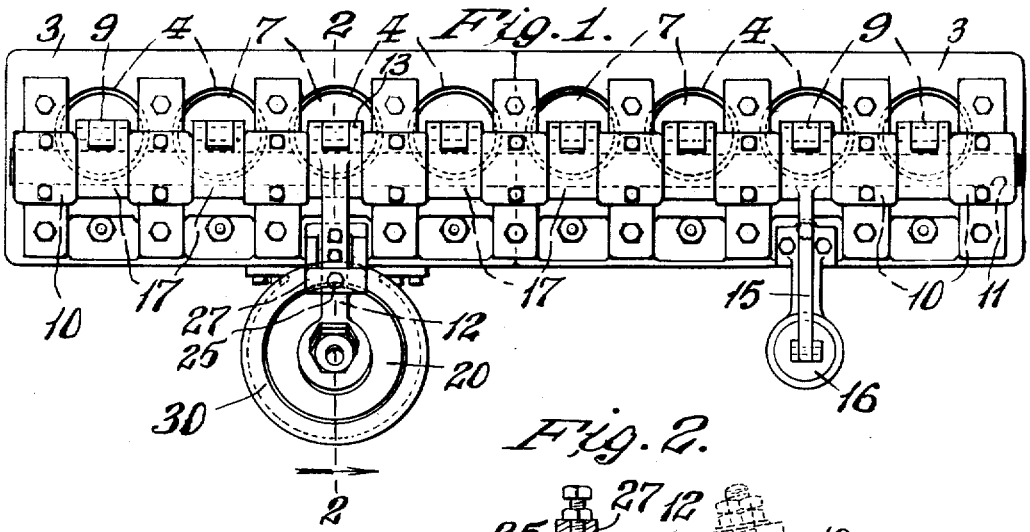
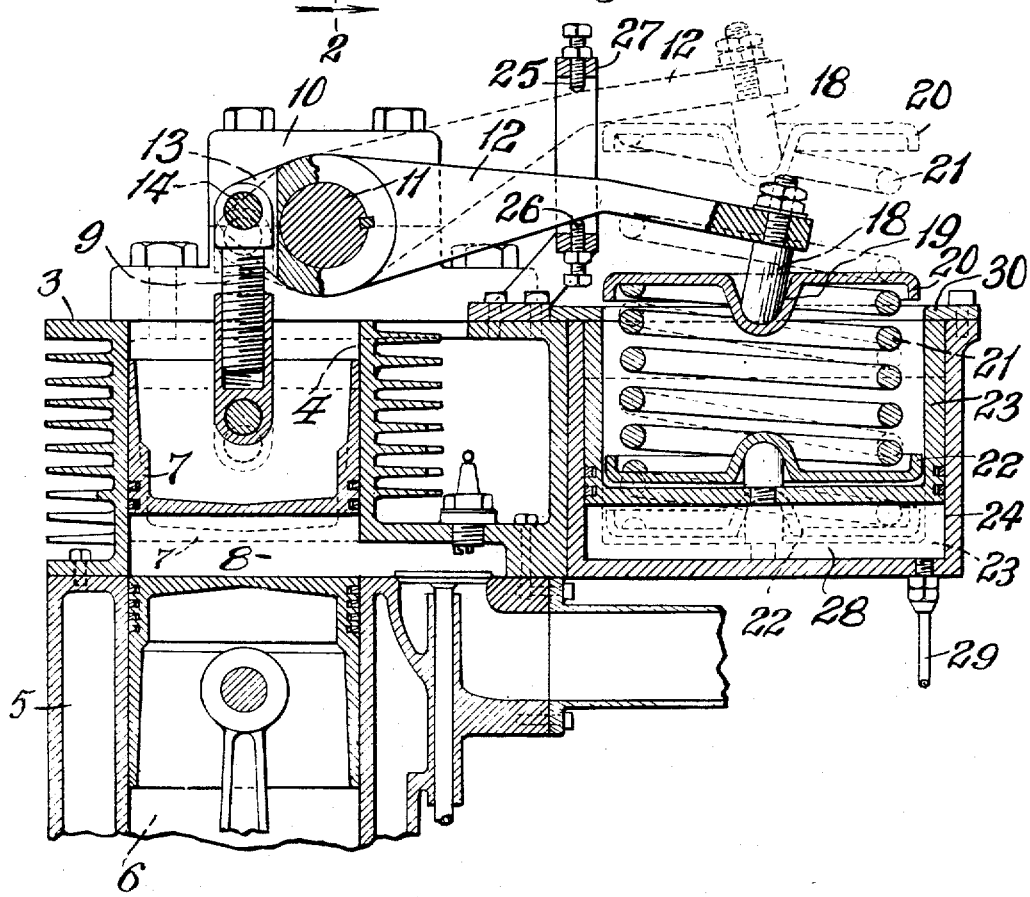
INVENTOR.
H. J. Kratzer
BY Herbert G. Fletcher
Atty.

Reissued Dec. 12, 1950

Re. 23,307

UNITED STATES PATENT OFFICE 23,307

VARIABLE COMPRESSION RATIO INTERNAL-COMBUSTION ENGINE

Herbert J. Kratzer, St. Louis, Mo.

Original No. 2,399,276, dated April 30, 1946, Serial No. 498,293, August 12, 1943: Application for reissue March 5, 1947, Serial No. 732,404

13 Claims. (Cl. 123—78)

Matter enclosed in heavy brackets [ ] appears in the original patent but forms no part of this reissue specification; matter printed in italics indicates the additions made by reissue

This invention relates to internal combustion engines and pertains particularly to the compression phase of the operation of the engine, and in which, the principal object is to provide the conventional, multi-cylindered internal combustion engine with simple and reliable means to greatly improve the over all thermal efficiency through the entire range of throttle operation.

A further object is to provide the engine with means to decrease the combustion chamber volume of respective cylinders, in approximately the same ratio that the absolute pressure in intake manifold decreases below the prevailing atmospheric pressure.

A still further object is to provide simple means permitting the adjustment of the degree of compression of respective individual cylinders of an engine to the exact compression pressure desired.

Another object is to provide for the automatic positioning of the mechanism so that a mean compression ratio will prevail as the engine is started, but which becomes fully effective after a minimum time of the engine's operation.

Yet another object is to employ the degree of vacuum in the plurality of cylinders of an engine, greatly augmented by the simultaneous decrease in the intensity of expansion pressures, to supply the motive force necessary to actuate the mechanism, and thereby to increase the compression ratio, resulting in an approximate constant absolute compression pressure at all times of engine operation.

Another further object is to provide the firing chambers with resiliently actuated means to automatically vary the size of the chambers with respect to the momentary torque loads of the engine.

Other objects and advantages will appear as this description progresses and by reference to the drawing, in which—

Figure 1 is a plan elevation of an eight-in-line, cylindered internal combustion engine, with the invention applied thereto and forming part thereof.

Figure 2 is an enlarged fragmentary vertical sectional elevation, taken approximately on the line 2—2 of Fig. 1.

Referring by numerals to the drawing, 3 designates each of two auxiliary blocks used in this instance of showing and describing the invention, as applied to a conventional four-cycle internal combustion engine, said blocks being used in place of the cylinder head blocks of the conventional engine.

Each block 3 is provided with its plurality of cylinders 4, each of which when the blocks are mounted and secured in place on the engine cylinder block or blocks 5, alining with respective work cylinders 6, and each cylinder 4 having an inverted piston 7 therein and a firing chamber 8, and connected to and extending upwardly from each piston is an adjustable link 9.

Longitudinally disposed above the blocks 3 and supported in bearings 10 is a horizontal torque shaft 11 and keyed thereto is a lever 12 having its short end 13 connected at 14 to one of the links 9, and connected to the upper end of another of the links 9 is a lever 15 of a dash-pot 16, said lever 15 also being keyed to the shaft 11.

The remaining links 9 of respective pistons 7 are connected at their upper ends to respective short levers 17, keyed to the shaft 11.

The long end of the lever 12 is provided on its free end with an adjustable pusher pin 18 in engagement with the depression 19 of a saddle 20 on the upper end of an expansion coil spring 21, the lower end of said spring being seated in a saddle 22 within an inverted piston 23 which is reciprocally mounted in a cylinder 24, supported from one of the blocks 3.

Upper and lower adjustable stops 25 and 26 respectively of a supporting bracket 27 are provided for limiting the swinging travel of the lever 12, said bracket being mounted on one of the blocks 3.

Provision is made for maintaining an oil body in the space 28 beneath the piston 23 in the cylinder 24, through the oil line 29 from the oiling system (not shown) of the engine, when the engine is operating.

In practicing the invention, when the engine is stopped, the spring 21 will force the lever 12 upwardy against the stop 25, and consequently, all of the pistons 7 will be moved to maximum lowered positions in the cylinders 4 by the rocking of the shaft 11, thereby decreasing the size of the firing chambers 8 to points of greatest compression ratio, as would be required to approximate designed compression at idling operation of the engine, and at which position the adjustable stop 25 is fixed.

Simultaneous with the spring 21 forcing the lever 12 against the stop 25 the spring will force the piston 23 down in the cylinder 24 as the oil therebeneath leaks back to the crank case through the oil line 29, and the free length of the spring will be approximately attained when the piston 23 seats against the bottom wall of the cylinder 24, as shown in dotted lines in Fig. 2.

The instant the engine is started, the compression pressure against the pistons 7 will rock the shaft 11 and cause the spring end of the lever 12 to bear against the unloaded spring 21 and start to compress it. Before any of the cylinders have fired, the lever 12 will have moved the approximate half of its normal operative range of travel in compressing the spring to its initial operative tension, and upon succeeding revolutions of the engine crank-shaft with normal ignition of all of the cylinders 6, the lever 12 will be completely moved against the bottom stop 26, which limits the degree of outward movement of the pistons 7, to positions of least compression ratio as required to provide the desired degree of compression, permitted by the fuel used. As the engine is [started] *starved* to idling, the lever 12 will be returned to a position determined by the initial spring tension.

The lever 15 of the dash-pot 16, being connected to the torque shaft 11, dampens out the inter-cyclic rocking movement impulses of the shaft 11, so that the mean average of the sum of the impulses will be required to be counterbalanced by the tension of the spring 21. The action of the tension of the spring 21 and the dash-pot 16, on the rocking of the shaft 11, results in no movement of the shaft 11 and the pistons 7 linked thereto, unless a change in engine torque occurs.

During the initial idling period of the engine, the lubricating oil pump of the engine, will force oil up under the piston 23, thus gradually moving the partly compressed spring 21 outwardly until the piston 23 reaches the stop-ring 30, at the outer end of the cylinder 24, and at which time the lever 12 will be in a position near the upper stop 25, because the initial spring pressure at the spring end of the lever, will just balance the combined opposed turning effort on the shaft 11, consisting of the algebraic sum of the gas pressures of all of the pistons 7 on their respective short lever connections with the shaft 11. Thus, as the engine was idling, the oil pressure from the oil line 29 in raising the spring piston 23, also raised the spring end of the lever 12 which caused the cylinder head pistons 7 to be moved to positions of minimum combustion chamber volume in respective firing chambers 8 for providing a maximum compression ratio for efficient idling operation of the engine.

When the engine throttle (not shown) is opened a small degree, the cylinder pressures of all cylinders during all cycles of operation increase a commensurate degree, as the vacuum created during suction strokes is less intense, the compression resistance greater, as well as the expansion pressures being greater.

In addition, there will be some increase in cylinder gas pressures while exhausting spent gas charges, thus the algebraic sum of instantaneous cylinder pressures will increase and result in rocking the shaft 11 until the increased compression on the spring 21 will just counterbalance the increased forces on the pistons 7, and simultaneously, as the lever 12 moved away from the stop 25, the pistons 7 moved outwardly thus providing a slightly increased combustion chamber volume, as required to maintain approximate constant compression.

With the throttle wide open, the forces of cylinder gas pressures on the pistons 7, attain a maximum value and determine[s] the maximum spring tension necessary to just counterbalance them (lever 12 being slightly away from stop 26), so that a minimum of drop from the maximum value, will be effective in causing the spring 21 to move the pistons 7 inwardly. Any throttling effect, incidental or intentional, will obviously cause a decrease in the sum of gas pressures on the pistons 7, with a proportionate decrease in the torque output of the engine, and the spring tension will then relocate the lever 12 to just balance the smaller forces on the pistons 7 and in so doing, relocate said pistons to positions of greater compression ratio. Thus, since the engine torque output is approximately directly proportional to forces on the pistons 7, it is obvious that the automatically selected compression ratio will vary *approximately* inversely proportionate to the torque output of the engine.

By utilizing the varying gas pressures as well as the varying vacuums in the respective operating cylinders, an extremely simple, reliable and efficient mechanism is provided, whereby the corrective forces are large compared to the small inherent friction of the simple linkages used. Due therefore, to the simple mechanism disclosed, automatically selected, varying compression ratios, will instantaneously and reliably remain adjusted to the highest values as indicated for best thermal efficiency, and should border-line knocking occur, the greatly increased combustion chamber pressures in effecting an enlargement of the combustion chamber volumes, inherently remove[s] the primary cause.

The adjustable links 9 permit exact equalization of individual cylinder compression, and the entire engine compression range can be adjusted up or down, and to meet final requirements for fine or minute changes, the adjustable pusher pin 18 on the spring end of the lever 12 is provided, which when adjusted will be effective on all of the pistons 7 and their respective cylinders 6, with respect to cylinder compression.

The use of the dash-pot 16 in conjunction with the shaft 11, will dampen-out pulsation at the lever 12, and the oil body beneath the piston 23 which is drained at times of engine shut-down for unloading the spring 21, while not essential during normal operation, does assure a most prompt outward movement of the pistons 7, during the first ¼ revolution of starting the engine, to eliminate possible excessive compression and pre-ignition at initial starting operation.

While an embodiment of the invention is here shown and described, obviously many others may occur to those skilled in the particular art. I, therefore, do not limit myself to the details described, but claim as my invention all variations and modifications within the scope of the subjoined claims.

What I claim is:

[1. A cylinder for an internal combustion engine having a movable wall with manually adjustable means therefor, and automatically actuated means cooperable to move said wall between adjustably fixed positions.]

[2. A cylinder for an internal combustion engine having a manually adjustable movable wall in axial alinement with the cylinder, automatically actuated means cooperable to move said wall to decrease or increase the firing chamber of the cylinder and a pair of adjustable limiting stops cooperable with said means.]

[3. A cylinder for an internal combustion engine having a manually adjustable movable wall, and spring actuated means cooperable to move said wall between predetermined positions.]

[4. An internal combustion engine having a cylinder with a manually adjustable movable wall forming a part of the firing chamber thereof, and spring actuated linkage cooperable with said wall to move it between fixed predetermined positions.]

[5. A multi-cylindered internal combustion engine having a manually adjustable movable wall forming a part of the firing chamber of each cylinder, and automatically actuated means cooperable to move all of said walls either inwardly or outwardly to vary distances in respective firing chambers.]

[6. A multi-cylindered internal combustion engine having a manually adjustable movable wall forming a part of the firing chamber of each cylinder, and spring actuated means cooperable to move all of said walls either inwardly or outwardly to vary distances in respective firing chambers.]

[7. A multi-cylindered internal combustion engine having a manually adjustable movable wall in axial alinement with respective cylinders and forming a part of the firing chamber of each cylinder, and resiliently actuated linkage cooperable to move all of said walls either inwardly or outwardly of respective cylinders.]

8. A multi-cylindered internal combustion engine having manually adjustable cylinder heads, spring actuated linkage cooperable to move said heads varying distances between adjustably fixed stops, and a pulsation eliminator cooperable with said linkage.

9. A multi-cylindered internal combustion engine having movable cylinder heads, a rock shaft, individually adjustable linkage connecting said heads to the rock shaft, and a spring actuated lever connected to said rock shaft having adjusting means at one end thereof.

10. A multi-cylindered internal combustion engine having movable cylinder heads, a rock shaft, individually adjustable linkage connecting said heads to the rock shaft, a spring actuated lever connected to said rock shaft having adjusting means at its extending end, and a fluid actuated piston cooperable with the spring of said lever.

11. A multi-cylindered internal combustion engine having movable cylinder heads in axial alinement with respective cylinders, a rock shaft, individually adjustable linkage connecting said heads to the rock shaft, a spring actuated lever secured on said rock shaft, and a pair of adjustable stops cooperable with said lever.

12. A multi-cylindered internal combustion engine having movable cylinder heads, a rock shaft, individually adjustable linkage connecting said heads to the rock shaft, a lever secured to said rock shaft, a fluid cylinder, a piston in said cylinder, and a coil spring cooperable at one end with said piston and at its other end with said lever.

13. An internal combustion engine having a cylinder and a communicating firing chamber, a movable head in said firing chamber, a lever connected to said head, a cylinder having an oil pressure supply source, a piston in said oil cylinder adapted to be actuated by the oil pressure therein, a coil spring interposed between said lever and said piston, and a piston stop at the outer end of said oil cylinder.

[14. A cylinder for an internal combustion engine having a movable wall, automatically actuated means cooperable to move said wall to positions intermediate its movable length, and other means effective on said first means during starting of the engine.]

15. The method of operating a variable compression ratio internal combustion engine, consisting of the automatic selection of a predetermined minimum compression ratio for the duration of the engine starting operation, and of subsequently [and] automatically selecting, *directly by combustion chamber pressures at all engine speeds and independently of intake manifold pressures*, compression ratios approximately inversely proportionate to the developed engine torque.

[16. A cylinder for an internal combustion engine having a movable wall, spring actuated means cooperable to move the wall to decrease or increase the firing chamber of the cylinder, and automatic means cooperable to increase the spring pressure of said first means.]

[17. A multi-cylindered internal combustion engine having manually adjustable cylinder heads, and fixed stops between which said heads are automatically positioned.]

[18. A multi-cylindered internal combustion engine having respective cylinder heads, a rock shaft, and adjustable linkage connecting said heads to the rock shaft.]

[19. An internal combustion engine having a cylinder and a communicating firing chamber, a movable head in said firing chamber, a spring actuated lever cooperable with said head, an adjustable stop to limit outward movement of said head, and manually adjustable means located between said head and said lever.]

[20. An internal combustion engine having a cylinder and a firing chamber, a movable head in said firing chamber, a lever, manually adjustable means connecting said lever to said head, a cylinder having a fluid pressure supply source, a piston in said fluid cylinder adapted to be actuated by the fluid pressure therein, and a spring interposed between said lever and said piston.]

*21. The method of operating a variable compression ratio internal combustion engine, consisting of the automatic selection of a low compression ratio for the duration of the engine starting operation, and of subsequently and automatically selecting higher compression ratios as determined directly by combustion chamber pressures independently of intake manifold pressures.*

*22. In an internal combustion engine, a cylinder having a movable wall, a device acting automatically when the engine is starting to exert minimum thrust on said wall thereby providing a minimum compression ratio in said cylinder, and means acting automatically and independently of the gas pressure in said cylinder, and independently of intake manifold pressures when the engine is running normally to increase the thrust of said device on said wall.*

*23. An internal combustion engine having a working cylinder and a firing chamber, a movable head in said firing chamber, a lever, manually adjustable means connecting said lever to said head, a cylinder having a fluid pressure supply source other than the pressure in said working cylinder, a piston in said fluid cylinder adapted to be actuated by the fluid pressure therein, and a spring interposed between said lever and said piston.*

*24. In an internal combustion engine having a plurality of cylinders with individually movable cylinder heads, a spring with associated individual connections to each head urging all of said heads inwardly of the cylinders against the cylinder gas pressures, a seat for said spring*

*movable to a retracted low-tension spring position for engine starting and to an advanced higher-tension spring position for normal engine operation, and mechanism actuated automatically by the operating engine to advance said seat from the retracted position to the advanced position.*

*25. In an internal combustion engine having a plurality of cylinders with individually movable cylinder heads, a common spring with associated individual connections to each head urging all of said cylinder heads inwardly of the cylinders against the cylinder gas pressures, a seat for said spring movable to a retracted low-tension spring position for engine starting and to an advanced higher-tension spring position for normal engine operation, a chamber for said seat, and fluid supplied to said chamber under pressure provided automatically by the operation of the engine to move said seat from said retracted engine-starting position to said advanced engine-operating position.*

*26. An engine as described in claim 24 in which each individual cylinder head connection positively positions the head relative to the common urging spring, there being means in each connection for varying the relative position of the head and the spring.*

HERBERT J. KRATZER.

REFERENCES CITED

The following references are of record in the file of this patent or the original patent:

UNITED STATES PATENTS

| Number | Name | Date |
|---|---|---|
| Re. 18,595 | Wilson | Sept. 13, 1932 |
| 791,124 | Baehr | May 30, 1905 |
| 912,717 | Murphy | Feb. 16, 1909 |
| 1,183,777 | Soules | May 16, 1916 |
| 1,313,414 | Ottewell | Aug. 19, 1919 |
| 1,474,954 | Brown | Nov. 20, 1923 |
| 1,639,477 | Wilson | Aug. 16, 1927 |
| 1,812,572 | Talbot | June 30, 1931 |
| 1,874,682 | Woolson | Aug. 30, 1932 |
| 1,891,587 | Wright | Dec. 20, 1932 |
| 2,040,652 | Gaty | May 12, 1936 |
| 2,125,407 | Tsuneda | Aug. 2, 1938 |
| 2,145,017 | Tsuneda | Jan. 24, 1939 |
| 2,252,153 | Anthony | Aug. 12, 1941 |

FOREIGN PATENTS

| Number | Country | Date |
|---|---|---|
| 30,162 | Great Britain | Dec. 31, 1896 |
| 2,015 | Great Britain | Jan. 27, 1909 |
| 25,736 | Great Britain | Nov. 9, 1912 |
| 483,298 | Great Britain | July 26, 1936 |
| 813,503 | France | Feb. 22, 1937 |
| 27,085 | Norway | June 26, 1909 |